United States Patent [19]

Dantlgraber et al.

[11] Patent Number: 5,613,361
[45] Date of Patent: Mar. 25, 1997

[54] HYDRAULIC CIRCUIT FOR SUPPLYING A PLURALITY OF SERIES-OPERATED OF A HYDRAULICALLY CONTROLLED INSTALLATION

[75] Inventors: Jorg Dantlgraber, Lohr-Sackenbach; Lothar Schulz, Bischbrunn; Reiner Puschel, Lohr/Main, all of Germany

[73] Assignee: Mannesmann Rexroth GmbH, Germany

[21] Appl. No.: 352,449

[22] Filed: Dec. 9, 1994

Related U.S. Application Data

[63] Continuation of Ser. No. 943,242, Sep. 10, 1992, abandoned.

[30] Foreign Application Priority Data

Sep. 11, 1991 [DE] Germany .......................... 41 30 219.2

[51] Int. Cl.[6] .................................................. F16D 31/02
[52] U.S. Cl. ................................. 60/427; 60/444; 60/464; 60/475; 60/476; 60/484
[58] Field of Search .............................. 60/427, 444, 464, 60/469, 475, 476, 484

[56] References Cited

U.S. PATENT DOCUMENTS

| | | | |
|---|---|---|---|
| 3,744,375 | 7/1973 | Kubik | 60/444 |
| 3,864,911 | 2/1975 | Gellatly et al. | 60/476 |

FOREIGN PATENT DOCUMENTS

| | | | |
|---|---|---|---|
| 4028337 | 3/1991 | Germany . | |
| 40106 | 3/1982 | Japan | 60/429 |
| 50301 | 3/1983 | Japan | 60/464 |
| 193901 | 11/1983 | Japan | 60/476 |
| 9354 | 1/1984 | Japan | 60/427 |
| 59-151602 | 8/1984 | Japan . | |

OTHER PUBLICATIONS

Pippenger, J. J., Industrial Hydraulics, N.Y., McGraw–Hill, Inc, 1979, pp. 403, 407, 409, 410, TJ840.P52 1979.

Primary Examiner—F. Daniel Lopez
Attorney, Agent, or Firm—Cushman Darby & Cushman Intellectual Property Group of Pillsbury Madison & Sutro, LLP

[57] ABSTRACT

A hydraulic circuit for supplying a plurality of series-operated consumers of a hydraulically controlled installation, in particular of an injection molding machine, having a pump with feed-flow pressure control, is described. To be able to slow down greater moving masses with very little expenditure in regard to circuitry and devices, only a portion of the consumers, such as the extruder, the injection unit and possibly the ejector are operated in open circulation, while at least one selected further consumer, such as the clamping unit of the injection molding machine, where a greater mass must be moved in alternating directions, is moved in semi-closed or closed circulation.

37 Claims, 5 Drawing Sheets

HYDRAULIC CIRCUIT FOR SUPPLYING A PLURALITY OF SERIES-OPERATED OF A HYDRAULICALLY CONTROLLED INSTALLATION

This is a continuation of application Ser. No. 07/943,242, filed on Sep. 10, 1992, which was abandoned upon the filing hereof.

BACKGROUND OF THE INVENTION

1. Field of the Invention

The invention relates to a hydraulic circuit for supplying a plurality of series-operated consumers of a hydraulically controlled installation, in particular of an injection molding machine, having a pump with feed-flow pressure control.

2. Description of the Related Art

In a hydraulic circuit of this type, such as is used in injection molding machines, the individual consumers, for example the injection unit, the extruder, the clamping unit, the ejector, etc., are customarily supplied serially by a pump with feed-flow pressure control. Check valves are placed upstream of the individual consumers, which are opened selectively and, as a rule sequentially, for activating the respective consumer.

Accordingly, inflow control takes place in such a hydraulic circuit, by means of which a slow-down of a consumer, i.e. of the mass moved at this consumer, is impossible from a structural point of view without additional expenditures for valves. For this reason it is necessary to provide additionally a proportional valve at consumers of this type, in particular consumers of high mass, such as the clamping unit or possibly the ejector. This complicates the structure of the hydraulic circuit and the control circuitry.

SUMMARY OF THE INVENTION

It is, therefore, one object of the present invention to further improve the hydraulic circuit of the above described type in such a way, that the timed, closely controlled slowdown of even large moving masses becomes possible by means of as simple as possible a structure and a correspondingly simple control.

In accordance with the present invention, the hydraulic circuit is divided into two. While a portion of the consumers where lesser acceleration forces occur, such as the extruder, the injection unit and possibly the ejector of the injection molding machine, are operated in an open circulation mode, at least one selected consumer, such as the clamping unit of the injection molding machine, is operated in a closed or semi-closed circulation. In this way any slowdown of the moved mass of the clamping unit becomes possible without an additional proportional valve.

The actual realization of the movement operation in a semi-closed or closed circulation of such a selected consumer can take place in several ways. A first variant is shown in FIGS. 1 and 2, while another advantageous variant is shown in particular in FIG. 3.

The first advantageous variant is beneficial in connection with a pump with adjustable displacement volume which can be rotated past zero, i.e. can also be adjusted to a negative rotation angle. In this case the feed direction of the pump is reversed for slowing down the selected consumer. In connection with this, use is made in an advantageous manner of the fact that the individual consumers of the hydraulically controlled installation are operated serially, so that the remaining consumers are not activated when the selected consumer or consumers which is moved in the semi-closed or closed circulation, is activated.

Pumps with adjustable displacement volumes, which are operated in feed-flow pressure control, require a defined adjusting pressure of, for example, 20 bar at the output, which is returned to the adjusting side of the pump. Thus, in order to be able to set the pump to a negative rotation angle, an auxiliary pump is assigned to the pump, i.e. the main pump, which provides the adjusting pressure required for the reversing phase. Various embodiments can be used for this auxiliary pump, for example a pressure-regulated pump, but also a fixed displacement pump. To be able to keep the pump output in the latter case as low as possible while still seeing to it that the required adjustment pressure is assuredly attained, a shutter is placed downstream of the pump for the timed, controlled increase of the pump output pressure to the pressure level required for the controlled adjustment of the main pump. This shutter is always bypassed when the output pressure of the main pump has reached the adjustment pressure level.

In accordance with the further embodiment of claim 12, the timed, controlled bridging of the shutter is realized with particularly simple circuitry measures.

The use of a fixed displacement pump can be combined in an advantageous manner with a cooling and/or filter circuit which results in the particular advantage that the filter and/or cooling circuit can be provided with a constant flowthrough. For example, using the throttle placed downstream of the auxiliary pump, it is easily possible to provide an adjustment pressure of approximately 20 bar when connecting the throttle, even though the normal feed pressure of the auxiliary pump lies only between 4 to 5 bar.

In case a selected consumer has a differential cylinder, this consumer is moved in semi-closed circulation. When retracting the piston rod, which is slidingly displaceable in the differential cylinder, more hydraulic fluid or hydraulic flow medium leaves the cylinder chamber, which has a larger diameter, than the pump feeds into the cylinder chamber at the piston rod side, i.e. into the annular chamber located there. In accordance with this embodiment, this excess oil is conducted via a drain valve to the reservoir. The characteristic of the opening of the latter can be used advantageously for providing the slowdown of the consumer under as low a pressure as possible.

The drain valve is advantageously provided with two control connections or two pre-controls and in this way is additionally used as a pressure control valve. The inlet line of the drain valve is connected with that side of the pump which is used for charging the cylinder chamber with the larger diameter. The restoring spring cooperating with this control connection is of such a size that the pressure limiting function for the hydraulic circuit to a pressure of approximately 200 bar takes place via this control connection.

In order to be able to reduce the pressure definitely during operation of the consumers which, as a rule, have check valves upstream in open circulation, it is advantageous to further embody the hydraulic circuit. However, it is also possible to provide the function of the 2/2-way valve, which is switched parallel with the back-pressure valve, by means of the previously described drain valve. A third control connection or a third pre-control is then associated with it in a preferred manner.

In accordance with the second variant of operating a portion of the consumers in open circulation and another portion in closed or semi-closed circulation, a 4/3-way valve instead of a 2/2-way valve is placed upstream of a selected consumer operated in semi-closed or closed circulation. By means of this 4/3-way valve the two working chambers of the work cylinder assigned to the consumer can be alternately connected with the pumping or aspirating connection of the pump. In this case the adjusting pump only feeds in one direction, so that the previously mentioned auxiliary pump for making the reversal of the pump into the negative rotation angle range possible can be omitted. This provides particular advantages especially when the consumer has a differential cylinder, which is then moved or operated in semi-closed circulation.

In this embodiment, too, the drain valve has two control connections or pre-controls, one of which is conducting the pressure downstream of the pump and the other is conducting the pressure upstream of the pump. In this case the drain valve again performs a pressure limiting and switching function.

The characteristic of the opening of the drain valve is advantageously embodied by means of which the defined or jerk-free slowdown of the mass at the selected consumer can be assured. This characteristic can be attained particularly advantageously and by means of a particularly simple circuit where a throttle for the drain valve is provided in a bypass line leading to the reservoir.

It was shown to be particularly advantageous for regulating the position of the consumer to provide the control not only with the signals of a displacement transducer but also additionally with the signals of two pressure transducers, one of which is upstream and the other downstream of the pump.

Several exemplary embodiments of the invention will be described in detail below by means of schematic drawings where like reference numerals represent like structural elements.

Other objects, features, and characteristics of the present invention, as well as the methods of operation and functions of the related elements of structure, and the combination of parts and economies of manufacture, will become more apparent upon consideration of the following detailed description.

BRIEF DESCRIPTION OF THE DRAWINGS

FIGS. 4A and 4B are diagrams illustrating the switching characteristic of a drain valve in accordance with the invention in comparison with the characteristic of a conventional valve.

DETAILED DESCRIPTION OF THE PREFERRED EMBODIMENTS

Figure 1:
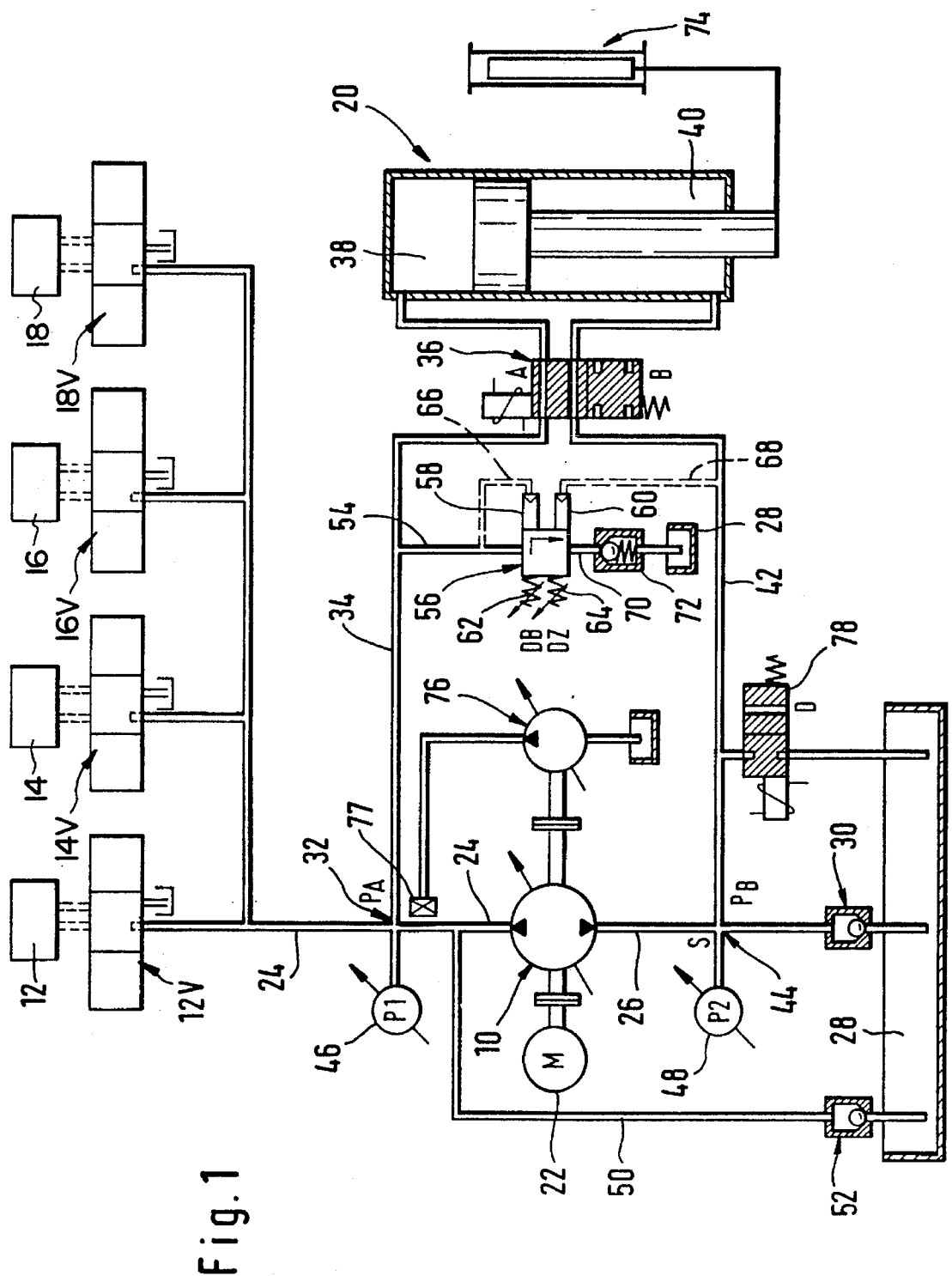
FIG. 1 is a block diagram of a first embodiment of the hydraulic circuit with a consumer moving in semi-closed circulation.

A hydraulic circuit for supplying a plurality of serially operated consumers or uses of hydraulic forces is shown in FIG. 1 such consumers can be part of a hydraulically controlled installation, such as an injection molding machine line or system. The consumers 12 to 20 are supplied by a pump 10 with feed-flow pressure control. Pump 10 can be, for example, a pump with an adjustable displacement volume, and can be driven by any convenient means such as motor 22. The consumers shown at 12 to 18 are part of a first category, where the exactly timed acceleration and slowdown of moving masses is not of very great importance. Where consumers 12 to 18 are in use with, for example injection molding equipment, the consumers 12 to 18 could comprise an extruder, an injection unit and possibly one or more ejectors, for example.

The consumer, shown at 20, represents a selected consumer where it is important to accelerate or slow down large masses in an exactly timed manner. In connection with the field of application in injection molding equipment this could be a clamping unit, for example, where considerable masses must be accelerated and/or slowed down in a short or controlled time.

To perform the slowdown of the mass connected with such a consumer without additional proportional valves in the outlet and therefore with very little expenditure in regard to circuitry and devices, only the users 12 to 18 are operated in open circulation. The selected consumer 20 is moved in semi-open circulation. This will be described in detail below.

The pump 10 is a pump which can be rotated past zero and with adjustable displacement volume, i.e. a pump the rotation angle of which can be changed into the negative range. The pump has two connecting lines 24 and 26, of which the connecting line 24 leads to the parallel switched consumers 12 to 18, upstream of each of which a separate check valve 12 V to 18 V is connected. The consumers 12 to 18 are exclusively controlled when a positive rotation angle has been set at the pump 10 and therefore feeding of hydraulic flow medium from a reservoir 28 takes place via a back-pressure valve 30 and the pump 10 into the connecting line 24.

At the point 32, a line 34 branches off the connecting line 24, which is brought via a 4/2-way valve 36 which, for example is electrically controlled, to the cylinder chamber 38 of larger diameter of the consumer 20, which is embodied as a differential cylinder. The cylinder chamber 40 on the side of the piston rod and embodied as an annular chamber can be connected via the 4/2-way valve 36 with a line 42 terminating at the point 44 in the connecting line 26 of the pump 10. Pressure transducers 46 and 48 are disposed in the lines 24 and 26, the output signals of which are employed for the position control of the consumer 20, as will be described in more detail hereinafter.

A second aspirating line is designated by 50, from which the pump 10 can aspirate flow medium via a back-pressure valve 52 if the pump has been reversed to the negative rotation angle. It will be assumed for the operation of the hydraulically controlled installation that when a consumer is actuated, the remaining valves 12 V, 14V, 16 V, 18 V provided upstream have been brought into the check position.

A branch line 54 branches off the line 34 and is brought to the drain valve 56, which performs a connection function and a pressure limiting function. Two control connections 58 and 60 have been assigned to the drain valve 56 for this purpose, each of which cooperates with preferably adjustable control restoring springs 62, 64. The control connection 58 is connected with the branch line 54 via the control line 66, while the control connection 60 is connected with the line 42. For example, the connection function comes into operation at a pressure of approximately 5 bar in the control connection 60. The pressure limiting function becomes active at approximately 200 bar in the branch line 54. The drain line to the reservoir 28 is designated by 70. A pressurizing valve 72 is disposed in the drain line 70.

Reference numeral 74 designates a displacement transducer, by means of which the position of the consumer 20, for example the clamping cylinder of the injection molding machine, can be detected. It can be forwarded in the form of an actual value signal, together with the signals of the pressure transducers 46 and 48 at both sides of the pump 10, to the preferably electrically operating control of the position of the clamping cylinder.

Let it be initially assumed that the piston rod of the consumer 20 is to be extended. In this case a positive rotation angle has been set at the pump 10 and the 4/2-way valve 36 is opened. The other check valves 12 V to 18 V of the consumers 12 to 18 are closed. In this case pump 10 can transport more fluid in chamber 38 than is displaced out of the annular chamber 40. Therefore, the drain valve 56 is not activated as long as the pressure limiting function via the control connection 58 does not yet respond. The pump 10 is rotated back beyond zero, i.e. set to a negative rotation angle, for slowing down the piston rod or to reverse the movement at the consumer 20.

As a rule, pumps with reversible feed volume operate in such a way that the output pressure is returned to the pump as adjustment pressure. Accordingly, if the rotation angle of the pump is changed into the negative range, the required adjusting pressure of, for example 20 bar, is no longer present for a certain period of time at the outlet of the pump. To make possible a further reverse rotation movement, and thus rotating of the pump into a negative rotation angle in spite of this, the pump 10 is connected with a further auxiliary pump 76. In the embodiment in accordance with FIG. 1, the latter is designed as a pressure-controlled pump.

Figure 5:
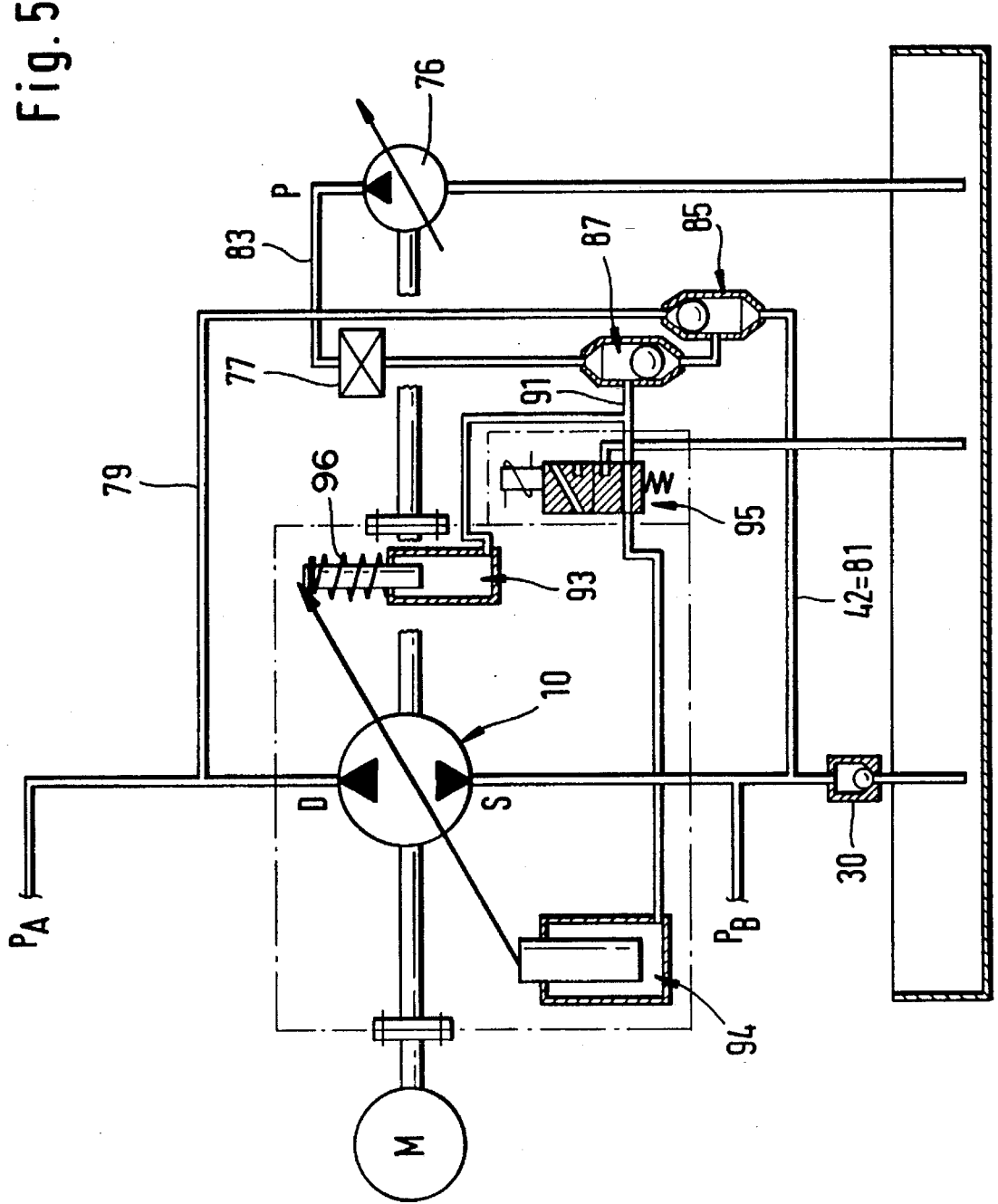
FIG. 5 shows the exemplary embodiment of a hydraulic circuit for adjusting a hydraulic pump.

The interface where the output pressure of the auxiliary pump 76 and the adjusting of the pump 10 can act is only schematically indicated by means of a box 77 in FIG. 1. How this adjusting is exactly accomplished in accordance with a preferred embodiment will be explained below by means of FIG. 5. To simplify this description, the same reference numerals will be used for the components which had already been shown in FIG. 1.

The output pressures of the pump 10 and the auxiliary pump 76 are applied to shuttle valves 85 and 87 via line branches 79 or 81 and 83. The respectively higher pressure applied to the shuttle valve 85 is passed on to the shuttle valve 87. One end of the output line of the shuttle valve 87, indicated by 91, is brought to a first control cylinder 93, and the other end to a second control cylinder 94 via a proportional valve 95. The control spring 96 associated with the first control valve 93 acts in the same direction as the control pressure in the associated control cylinder and attempts to rotate the pump to the largest possible positive feed volume. The control fluid supplied to the second control cylinder 94 under pressure via the proportional valve 94 acts counter to the spring 96. The proportional valve 95 is electrically triggered in such a way that the pressure corresponding to the instantaneous requirements, i.e. the desired pressure or desired feed quantity, of the pump 10 is set.

It can be seen that the adjustment pressure and the adjustment quantity of the pump 10, which is controlled as to pressure and quantity fed, is provided by the main pump 10 itself as long as one of the two pressures $p_A$ or $p_B$ on the aspiration or feed side of the pump 10 lies above the output pressure $p_H$ of the auxiliary pump 76. If this is no longer the case, something which can temporarily occur when the pump rotates beyond zero, the adjustment device of the pump 10 is supplied by the auxiliary pump 76 via the shuttle valve 87.

In case of a negative rotation angle of the pump, the line 26 is the feed line, so that the annular chamber 40 is supplied with pressure fluid via the line 42 and the 4/2-way valve 36. Accordingly, the piston rod is retracted, which means also that more flow medium must be displaced out of the cylinder chamber 38 than is supplied to the annular chamber 40. In this operational mode the drain valve 56 is opened and makes the connection from the line 54 to the line 70 and thus to the reservoir 28.

If one of the consumers 12 to 18 is activated, i.e. when the hydraulic circuit is operated exclusively in open circulation so that one of the check valves 12 V to 18 V is opened, care must be taken that the pressure in the associated consumer line can be definitely reduced, i.e. the pump may also feed in the direction to the reservoir for a short time. This is not easily possible because of the back-pressure valve 30. For this reason a 2/2-way valve is switched parallel with the back-pressure valve 30, which is brought into a switch position D, i.e. opened every time when an appropriate check valve 12 V to 18 V assigned to the respective series consumer 12 to 18 is opened.

The function of the 2/2-way valve could also be performed by a slightly modified drain valve 56. In this case a third pre-control or a third control connection is preferably associated with it, which carries a pressure which is characteristic for the operation of the serial consumer.

Figure 2:
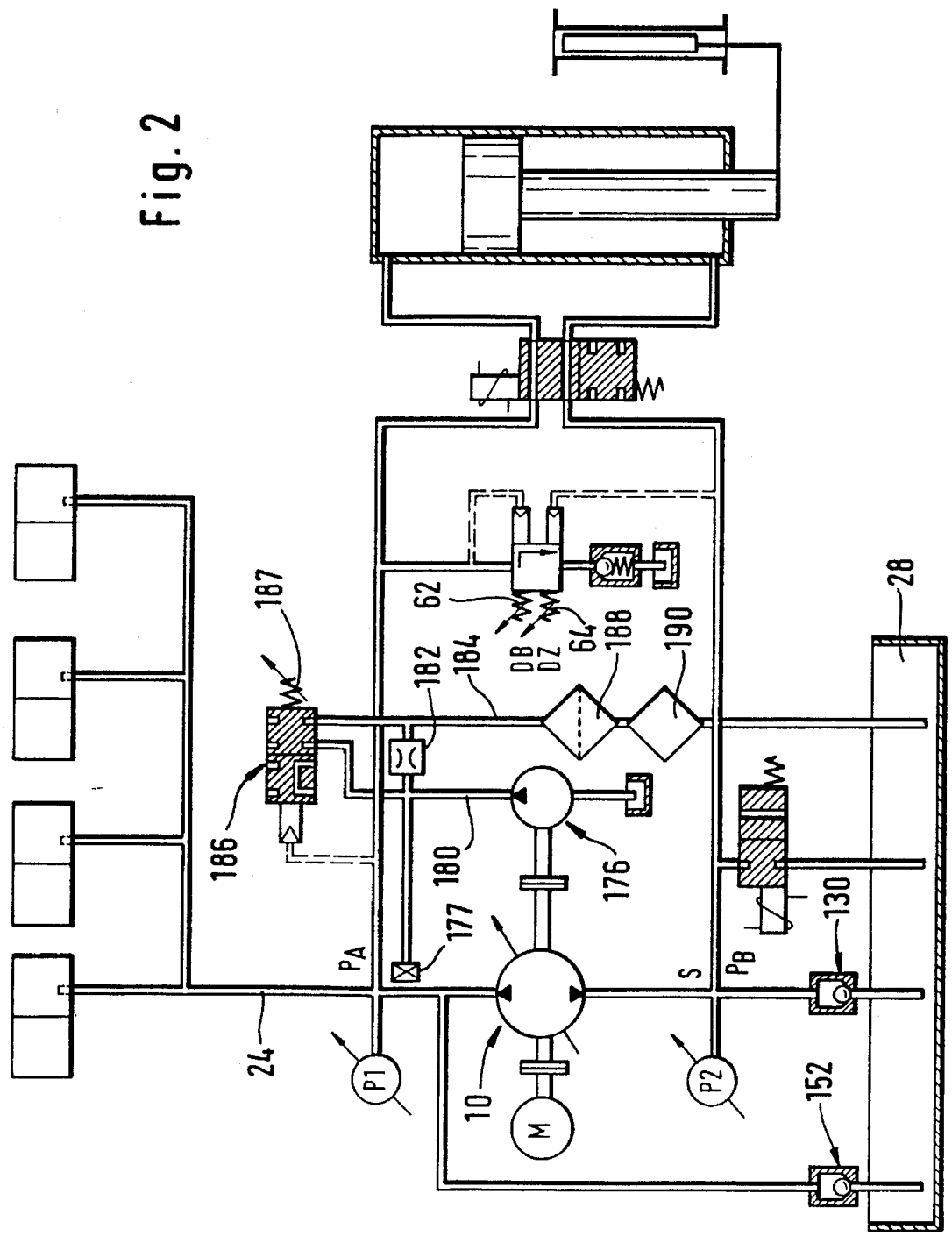
FIG. 2 is a view similar to FIG. 1 of a further embodiment of the invention.

A further embodiment of the hydraulic circuit is illustrated in FIG. 2, which only differs from that in accordance with FIG. 1 in that a different auxiliary pump is employed. The corresponding components can be easily distinguished in the drawings and will therefore not be explained again here in order to simplify the description.

In place of the pressure-controlled auxiliary pump 76 in accordance with FIG. 1, a fixed displacement pump 176 is provided which, however, has the same function as the pump 76. The outlet line 180 is again brought to the adjusting side of the pump 10. To build up sufficiently high pressure in the line 180, i.e. a sufficiently high adjusting pressure level for the adjusting pump 10, the pump 176 works against a throttle 182 in a drain line 184. The throttle 182 can be bypassed via a hydraulically-controlled directional control valve 186, the pressure for displacing the directional control valve 186 being bled off from the drain line of the pump 10. Accordingly, when the output pressure of the pump 10 has reached the adjusting pressure required for displacing the adjusting pump, the directional control valve 186 is opened so that the throttle 182 is now no longer effective. The flow medium conveyed by the auxiliary pump 176 then flows through the line 184 to the reservoir 28. This flow is advantageously used for cooling and/or filtering of the hydraulic flow medium. A filter 188 and/or a cooling device 190 are provided for this purpose in the drain line 184.

Figure 3:
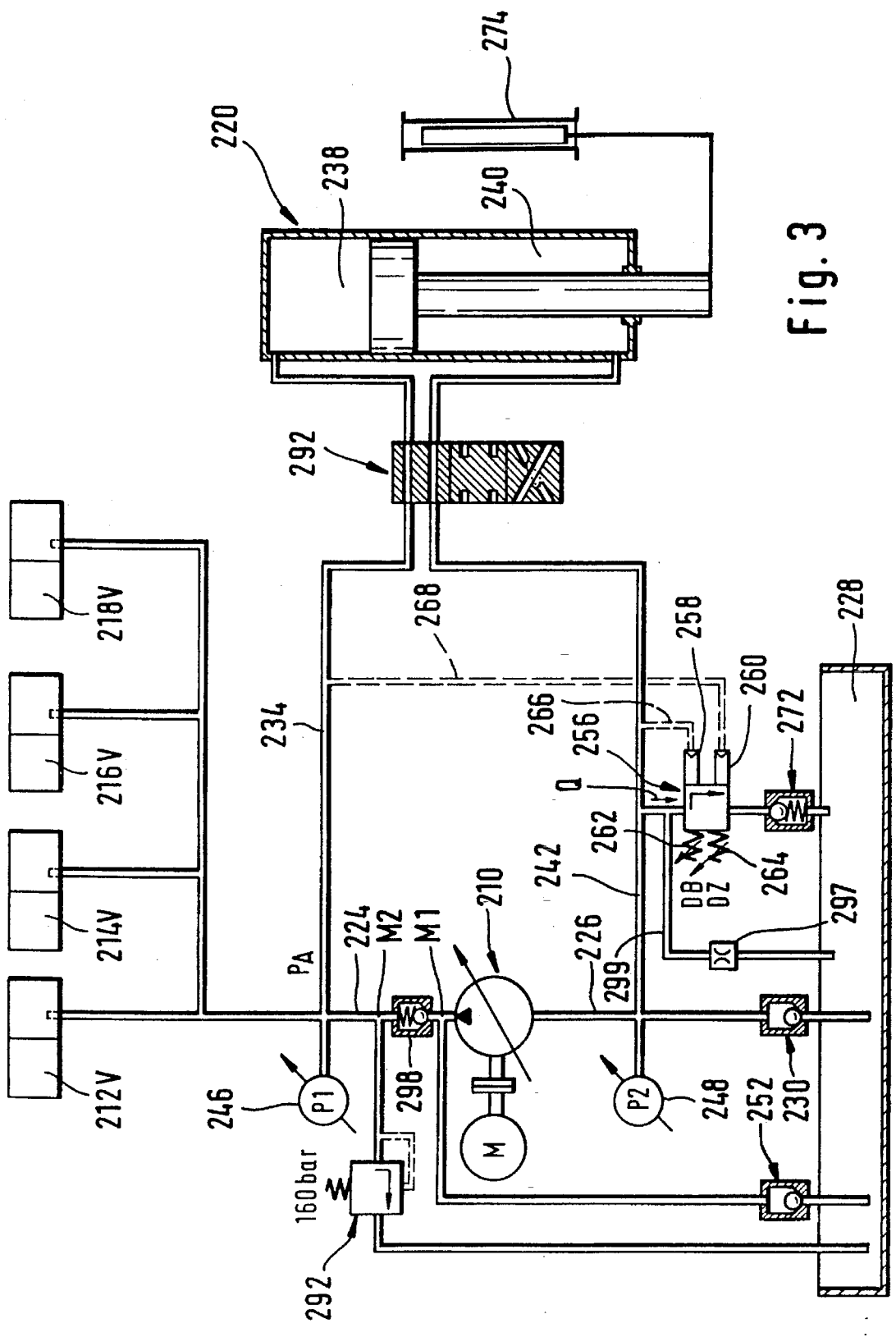
FIG. 3 is a view similar to FIGS. 1 and 2 of a third embodiment of the invention with a pump feeding in one direction.

FIG. 3 shows a third embodiment of the hydraulic circuit which, basically, is not functionally different from the previously described exemplary embodiments. However, it does not operate with an adjusting pump rotatable beyond zero but rather with an adjusting pump 210, which has only one conveying direction. In this exemplary embodiment those components, which correspond to the parts of the hydraulic circuit of the previously described embodiments, are indicated by similar reference numerals which are prefixed by "2".

The consumers 212 to 218 with the upstream check valves V212 to V218 are again operated exclusively in open circulation, while the consumer 220 is moved in semi-closed circulation. Different from the previously described exemplary embodiment, a 4/3-way valve 292 instead of the 2/2-way valve 36 is placed upstream of the consumer 220, by means of which the two work chambers 238, 240 can be alternately connected with the pump connection 224 or the aspirating connection 226. In this way the auxiliary pumps 76 and 176 of the previously described exemplary embodiments can be omitted. To assure that a sufficiently high adjusting pressure for the pump 210 can be supplied by its output, via a line corresponding to the line 79 corresponding to FIG. 5, to the adjustment device of the pump even if very low pressures obtain at the consumer, a pressurizing valve 298 is provided in the pump line 224 between the openings M1 and M2 of the lines leading to the back-pressure valve 252 or the pressure limiting valve 292. In this way it is possible to maintain a sufficiently high remaining pressure in the line 234, which is independent of the prestressing force of the spring of the pressurizing valve and which is sufficient in every case for adjusting the pump.

A drain valve is designated by 256, which is connected to the line 242 which branches off the aspirating line 226. The pressure there obtaining is measured via the pressure transducer 248, while the pressure in the pump line 224 is detected by the pressure transducer 246. The signals of the pressure transducers 246, 248 are supplied to the position control of the consumer 220, together with the signal of the displacement transducer 274.

Two control connections 258, 260 are also assigned to the drain valve 256 in order to perform a connecting and pressure limiting function in cooperation with associated, preferably adjustable control restoring springs 262, 264. The control connection 258 assuring the pressure limiting function is connected via the control line 266 with the line 242, and the other control connection 260 is connected via the control line 268 with the line 234.

In this case, too, it is necessary to displace an excess quantity of flow medium from the cylinder chamber 238 when the piston rod on the consumer 220 is retracted. This is again accomplished via the drain valve 256, which is opened in this operating phase.

In this embodiment in accordance with FIG. 3, as well as in the previously described exemplary embodiments, it is possible to affect the behavior in the course of slowing down the load by means of the characteristic of the opening of the drain valve 56 or 256 in such a way, that slowdown free of jerks or with only a few jerks is assured.

Figures 4A, 4B:
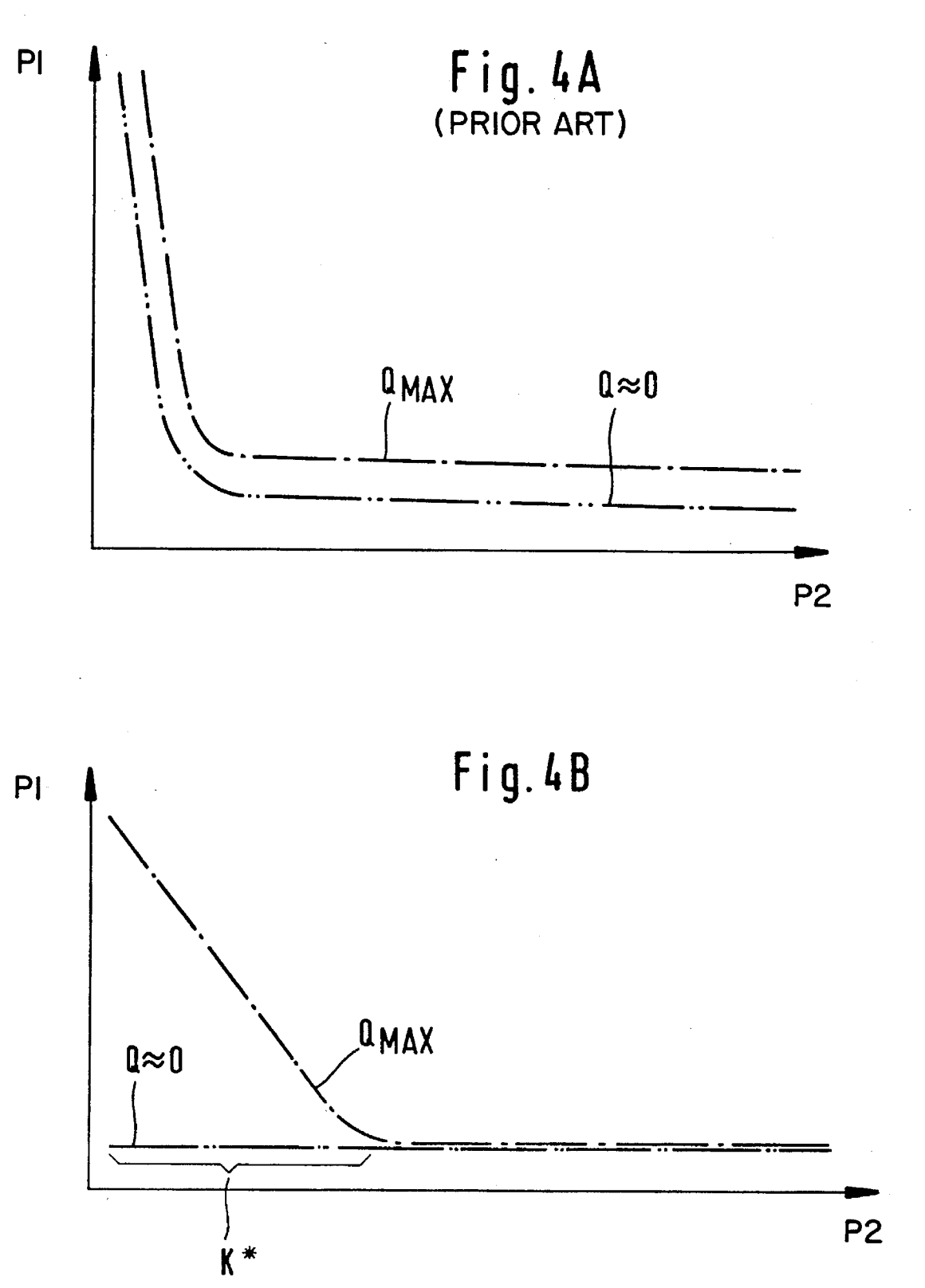

FIG. 4 compares the valve characteristic of the drain valve 56 or 256 desired by the invention with the characteristic of a conventional drain valve. Here, FIG. 4A shows a conventional embodiment which is characterized in that the pressure P1, i.e. the pressure to be maintained, abruptly drops with slowly increasing control pressure P2, where the characteristic curves of the various quantities flowing through essentially extend parallel to each other. In contrast thereto, the characteristic in accordance with FIG. 4B has been selected in the embodiment in accordance with the invention of the drain valve, i.e. in such a way, that the maintained pressure P1 is essentially kept at a constant, low value during flow-through of very small quantities of hydraulic fluid. With high flow-through of hydraulic fluid, a gradual decrease of the maintained pressure P1 takes place (dash-dotted line). This is attained in an advantageous manner by switching a throttle parallel to a conventional drain valve.

In particular, a bypass line 299 leading to the reservoir branches off the supply line of the drain valve 256, for example, in which a throttle or screen 297 with a suitable flow-through cross section is seated. As long as the flow-through quantity Q, i.e. the flow medium quantity to be drained, is greater, the sufficiently large pressure reduction at the throttle 297 sees to it that draining takes place via the drain valve. For flow-through rates near zero 1/min, the curve section K*, in FIG. 4B, can no longer be realized solely by varying the piston geometry. In this operational phase the curve K, is assured by means of the throttle 297.

An additional pressure-limiting valve for protecting the hydraulic circuit is designated by the reference numeral 292, by means of which the maximum system pressure can be limited to 160 bar, for example.

Obviously, deviations from the previously described embodiments are possible without departing from the basic concept of the invention. For example, the adjusting cylinder of the at least one consumer can also be embodied as a synchronous cylinder, which is then moved and operated in closed circulation.

Therefore, the invention provides a hydraulic circuit for supplying a plurality of serially operated consumers of a hydraulically controlled installation, in particular of an injection molding machine, where the hydraulic circuit has a pump with feed-flow pressure control. In order to be able to slow down large moving masses with little expenditure in regard to circuitry and devices, only a portion of the consumers, such as the extruder, the injection unit and possibly the ejector are operated in open circulation, while at least one selected further consumer, such as the clamping unit of the injection molding machine or possibly the ejector, where a greater mass must be moved in alternating directions, is moved in semi-closed or closed circulation.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A hydraulic circuit for supplying a plurality of consumers, operated sequentially, the hydraulic circuit having a main pump with feed-flow and pressure control, and wherein a portion of the consumers are operated by means of the main pump in an open circuit and at least one selected consumer, which moves a large mass in alternating directions, is operated by means of the main pump in a semi-closed or closed circuit, and wherein said main pump is associated with a means for switching the feed direction of the main pump for reversing the movement at the at least one selected consumer.

2. A hydraulic circuit of claim 1 wherein said means for switching the feed direction is a valve means upstream of said at least one selected consumer.

3. A hydraulic circuit of claim 1, wherein said main pump is a pump which can be rotated beyond zero and has an adjustable displacement volume, and wherein said means for switching the feed direction is a control means for rotating the pump beyond zero.

4. A hydraulic circuit in accordance with claim 3, characterized in that an auxiliary pump is assigned to the main pump, by means of which rotating of the main pump beyond zero to a negative rotation angle is possible.

5. A hydraulic circuit in accordance with claim 4, characterized in that the auxiliary pump is constituted by a pressure-controlled pump.

6. A hydraulic circuit in accordance with claim 1, 2 or 4, characterized in that the at least one consumer is a differential cylinder having a first and second chamber, a cross-section of the first chamber being larger than a cross-section of the second chamber, and that a part of an amount of a hydraulic fluid displaced from the first chamber is conducted via a drain valve to a reservoir and another part of the amount is supplied to an aspirating side of the main pump via a supply line.

7. A hydraulic circuit in accordance with claim 6, characterized in that the drain valve has two control connections, one of which is connected with the supply line and the other is connected to another side of the main pump.

8. A hydraulic circuit in accordance with claim 7, characterized in that a drain line of the drain valve leads to the reservoir via a pressurizing valve.

9. A hydraulic circuit in accordance with claim 7, wherein a characteristic of an opening of the drain valve is selected for slowing down the at least one consumer with little jerking in such a way, that at a high flow rate of the hydraulic fluid a maintained pressure rises steeply as a control pressure drops, and at a low flow rate of the hydraulic fluid, a magnitude of an increase in the maintained pressure, experienced as the control pressure drops, is reduced, the magnitude of the increase in the maintained pressure approaching zero as the flow rate approaches zero.

10. A hydraulic circuit in accordance with claim 6, characterized in that a 4/2-way valve is placed upstream of the at least one consumer, which is displaceable from a check position into a flow-through position against a force of a restoring spring.

11. A hydraulic circuit in accordance with claim 1, characterized in that a 4/2-way valve is placed upstream of the at least one consumer, which is displaceable from a check position into a flow-through position against a force of a restoring spring.

12. A hydraulic circuit as in claim 1 wherein the at least on selected consumer is a cylinder.

13. A hydraulic circuit for supplying a plurality of consumers, operated sequentially, of a hydraulically controlled installation having a main pump with feed-flow and pressure control, characterized in that a portion of the consumers are operated by means of the main pump in an open circuit and at least one selected consumer is operated by means of the main pump in a semi-closed or closed circuit, wherein the main pump is a pump which can be rotated beyond zero and has an adjustable displacement volume, and that its feed direction is reversed for reversing at the at least one selected consumer, wherein the pump aspirates hydraulic fluid from a reservoir via respectively one back-pressure valve and that to the back-pressure valve, which is active in the open circuit in the normal feed direction of the main pump when the other sequentially-operated consumers are operated, a 2/2-way valve is parallel connected each time an appropriate check valve, assigned to the respective sequentially-operated consumer, is opened.

14. A hydraulic circuit in accordance with claim 13, characterized in that an auxiliary pump is assigned to the main pump, by means of which rotating of the main pump beyond zero to a negative rotation angle is made possible.

15. A hydraulic circuit in accordance with claim 14, characterized in that the auxiliary pump is embodied as a fixed displacement pump.

16. A hydraulic circuit in accordance with claim 15, characterized in that a shutter is placed downstream of the fixed displacement pump for a time-controlled increase of main pump outlet pressure to a pressure level required for a controlled adjustment of the main pump, which is always bypassed, when the output pressure of the main pump has reached the adjusting level.

17. A hydraulic circuit in accordance with claim 16, characterized in that a branch line bypassing the shutter is led over a directional control valve, which is displaceable into a connecting position by the pressure in the feed line of the main pump against the preferably adjustable force of a restoring spring.

18. A hydraulic circuit in accordance with claim 15, characterized in that a cooling and/or filter circuit is selectively supplied by means of the auxiliary pump.

19. A hydraulic circuit in accordance with claim 18, characterized in that at least one cooling device and at least one filter are placed into a drain line downstream of a throttle.

20. The hydraulic circuit in accordance with claim 18 wherein at least one of a cooling device and a filter is placed into a drain line downstream of a throttle.

21. A hydraulic circuit in accordance with claim 14, characterized in that the auxiliary pump is constituted by a pressure-control pump.

22. A hydraulic circuit in accordance with claim 13, characterized in that the at least one consumer is a differential cylinder having a first and second chamber, a cross-section of the first chamber being larger than a cross-section of the second chamber, and that a part of an amount of a hydraulic fluid displaced from the first chamber is conducted via a drain valve to the reservoir and another part of the amount is supplied to an aspirating side of the main pump via a supply line.

23. A hydraulic circuit in accordance with claim 22, wherein a characteristic of an opening of the drain valve is selected for slowing down the at least one consumer with little jerking in such a way, that at a high flow rate of the hydraulic fluid a maintained pressure rises steeply as a control pressure drops, and at a low flow rate of the hydraulic fluid a magnitude of an increase in the maintained pressure, experienced as the control pressure drops, is reduced, the magnitude of the increase in the maintained pressure approaching zero as the flow rate approaches zero.

24. A hydraulic circuit in accordance with claim 22, characterized in that the drain valve has two control connections (pre-controls), one of which is connected with the supply line and the other is connected to another side of the main pump.

25. A hydraulic circuit in accordance with claim 24, characterized in that a drain line of the drain valve leads to the reservoir via a pressurizing valve.

26. A hydraulic circuit in accordance with claim 13, characterized in that a 4/2-way valve is placed upstream of the at least one consumer, which is displaceable from a check position into a flow-through position against a force of a restoring spring.

27. The hydraulic circuit of claim 13 wherein the hydraulically controlled installation is an injection molding machine and wherein the consumers operated in open circulation include an extruder, an injection unit, and an ejector, and the at least one selected consumer operated in a semi-closed or closed circulation is a clamping unit where a larger mass must be moved in alternating directions.

28. A hydraulic circuit for supplying a plurality of consumers, operated sequentially, of a hydraulically controlled installation having a main pump with feed-flow and pressure control, characterized in that a portion of the consumers are operated by means of the main pump in an open circuit and at least one selected consumer with two cylinder chambers is operated by means of the main pump in a semi-closed or closed circuit, wherein the main pump is embodied as a pump with adjustable displacement volume and wherein by means of a 4/3-way valve one of the two cylinder chambers of the selected consumer can be selectively connected to either a pressure or an aspirating connection of the main pump and concurrently the other cylinder chamber to the aspirating or pressure connection of the main pump.

29. A hydraulic circuit in accordance with claim 28, characterized in that the at least one consumer is a differential cylinder having a first and second chamber, a cross-section of the first chamber being larger than a cross-section of the second chamber, and that a part of an amount of a hydraulic fluid displaced from the first chamber is conducted via a drain valve to a reservoir and another part of the amount is supplied to said copy of the pump via a supply line).

30. A hydraulic circuit in accordance with claim 29, characterized in that the drain valve has two control connections (pre-controls), one of which is connected with the supply line and the other is connected to the other side of the pump.

31. A hydraulic circuit in accordance with claim 30, characterized in that the drain line of the drain valve leads to the reservoir via a pressurizing valve.

32. A hydraulic circuit in accordance with claim 28, characterized in that the main pump aspirates hydraulic fluid via a back-pressure valve, and that a drain valve is connected parallel with the back-pressure valve, through which an excess amount of hydraulic fluid can be shunted off to a reservoir.

33. A hydraulic circuit in accordance with claim 32, characterized in that the drain valve has two control connections, one of which carries a pressure downstream and the other carries a pressure upstream of the main pump.

34. A hydraulic circuit in accordance with claim 33, wherein a characteristic of an opening of the drain valve (256) is selected for slowing down the at least one consumer (220) with little jerking in such a way, that at a high flow rate of the hydraulic fluid a maintained pressure rises steeply as a control pressure drops, and at a low flow rate of the hydraulic fluid a magnitude of an increase in the maintained pressure, experienced as the control pressure drops, is reduced, the magnitude of the increase in the maintained pressure approaching zero as the flow rate approaches zero.

35. A hydraulic circuit in accordance with claim 34, characterized in that a throttle (297) is connected parallel with the drain valve (256).

36. The hydraulic circuit of claim 28 wherein the hydraulically controlled installation is an injection molding machine and wherein the consumers operated in open circulation include an extruder, an injection unit, and an ejector, and the at least one selected consumer operated in a semi-closed or closed circulation is a clamping unit where a larger mass must be moved in alternating directions.

37. A hydraulic circuit in accordance with one of claims 1–11, 5, 19, 23, 10–31, 32–35, or 27-20 characterized in that a displacement transducer is associated for controlling a position of the selected consumer, a measurement signal of which is supplied as an actual valve to an electrical control, together with signals of two pressure transducers, one of which is located upstream and another of which is located downstream of the main pump.

* * * * *